United States Patent [19]
Yang

[11] Patent Number: 5,399,948
[45] Date of Patent: Mar. 21, 1995

[54] GOVERNOR CIRCUIT FOR UNIVERSAL SERIES (OR COMPOUND) MOTOR

[76] Inventor: Tai-Her Yang, 5-1 Taipin Street, Si-Hu Town, Dzan-Hwa, Taiwan, Prov. of China

[21] Appl. No.: 6,473

[22] Filed: Jan. 21, 1993

Related U.S. Application Data

[63] Continuation-in-part of Ser. No. 745,271, Aug. 14, 1991, abandoned.

[51] Int. Cl.⁶ ............................................. H02P 3/18
[52] U.S. Cl. ..................................... 318/245; 318/252
[58] Field of Search ............... 318/431, 479, 805, 246, 318/249, 252, 253, 245; 388/833, 821, 902, 917; 187/116; 361/23, 30, 33, 55, 54, 56

[56] References Cited

U.S. PATENT DOCUMENTS

| | | | |
|---|---|---|---|
| 3,584,706 | 6/1971 | Hall | 187/116 |
| 3,617,844 | 11/1971 | Grygera | 388/821 |
| 3,902,572 | 9/1975 | Ostrander | 187/116 |
| 5,061,884 | 10/1991 | Soganovsky | 318/431 |

*Primary Examiner*—Jonathan Wysocki
*Assistant Examiner*—John W. Cabeca
*Attorney, Agent, or Firm*—Leonard Bloom

[57] ABSTRACT

A governor circuit for limiting the top speed of a universal series or compound motor. The governor circuit includes a voltage detector for detecting a selectable threshold voltage across the armature of the motor, and a current shunting circuit which is triggered by the voltage detector when the armature voltage of the motor reaches the threshold level to thereby shunt current through an auxiliary field winding and around the armature and/or main field winding, thereby limiting the speed of the motor. A plurality of embodiments is disclosed which accommodate various conventional power supply types.

28 Claims, 4 Drawing Sheets

GOVERNOR CIRCUIT FOR UNIVERSAL SERIES (OR COMPOUND) MOTOR

CROSS-REFERENCE TO RELATED APPLICATIONS

The present application is a continuation-in-part of application Ser. No. 07/745,271, filed Aug. 14, 1991, and now abandoned.

FIELD OF THE INVENTION

The present invention relates to universal type series (or compound) motors and, more particularly, to a device for governing the auxiliary field winding's field intensity of such motors.

BACKGROUND OF THE INVENTION

Conventional universal type series (or compound) motors are used in driving various kinds of industrial machinery and, particularly, electrical tools or small household appliances. However, series motors have the undesirable characteristic of being very load sensitive. As the load on the motor is decreased, the speed of the motor will increase causing excessive noise and excessive wear and tear on drive elements such as gears and bearings. In view of such defects, it is advantageous to limit the speed of series or compound motors.

SUMMARY OF THE INVENTION

Accordingly, it is an object of the present invention to employ a current shunting circuit which is triggered when the armature voltage reaches a selectable threshold to shunt current away from the armature, thereby limiting the speed of the motor.

It is another object of the invention to provide an auxiliary field winding in series with the above-described shunting circuit to further regulate the rate at which current is shunted.

It is a further object of the invention to provide a governor circuit which will detect the armature voltage of the series (or compound) motor and, additionally, trigger the above-described shunting circuit when the armature voltage reaches the preset threshold to shunt current through the auxiliary field winding as needed.

It is still another object of this invention to provide an amplifier circuit to increase the reaction time of the governor circuit.

It is yet another object of this invention to provide a plurality of configurations of the above-described governor circuit to accommodate the various conventional power supply types.

In accordance with the above-described and other objects, the invention provides a governor circuit for limiting the top speed of universal series or compound motor of the type having a series-connected main field winding and armature winding. The governor circuit generally comprises a voltage detector circuit coupled to the armature of one of such motors for detecting a threshold voltage across said armature, an auxiliary field winding coupled across the armature for providing a current shunt path around the armature, and a current shunting circuit connected in series with the auxiliary field winding for selectively shunting current therethrough and around the armature. The current shunting circuit is coupled to the voltage detector circuit and is triggered thereby upon detection of the threshold voltage to shunt current through the auxiliary field winding. This way, the armature voltage is clamped at the threshold level and the motor is limited to a maximum speed.

The components of the governor circuit may be variable to allow adjustment of the voltage threshold. In addition, a conventional isolator circuit such as an opto-isolator may be interconnected between the voltage detector circuit and the current shunting circuit to electrically isolate the two circuits. Similarly, a conventional amplifier-coupler may be interconnected between the voltage detector circuit and the current shunting circuit to expedite transmission of the trigger signal between the two circuits.

BRIEF DESCRIPTION OF THE DRAWINGS

Other objects, features, and advantages of the present invention will become more apparent from the following detailed description of preferred embodiments and certain modifications thereof when taken together with the accompanying drawings in which like components are similarly labeled.

Figure 12:
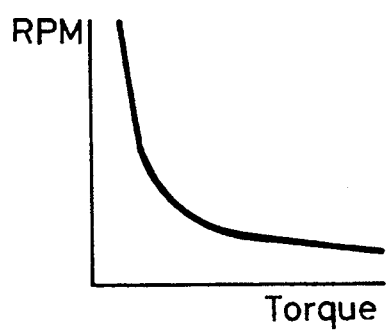
Figure 13:
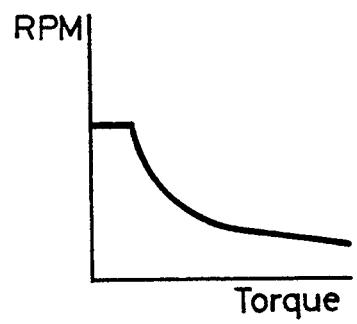

FIG. 12 is a RPM (speed) v. TORQUE (load) graph of the normal operating characteristic of a conventional series motor; and FIG. 13 is a RPM (speed) v. TORQUE (load) graph of the operating characteristic of a conventional series motor employing a governor circuit in accordance with the present invention.

DETAILED DESCRIPTION OF THE INVENTION

In general, when a universal series (or compound) motor encounters a small load, current flowing through the field winding is reduced. Once the field current is reduced, the magnetic flux is likewise weakened and the armature EMF increases. Consequently, there is a significant increase in the speed of the motor relative to the reduction in load torque. At near-zero loads, the excessive speeds may result in the motor breaking apart. Small motors as used in electric tools often drive loads through load gears. However, when such motors encounter near-zero loads it not only causes high-speed noise but shortens the life span of the load gear elements such as bearings and gears.

The present invention eliminates the above-described drawbacks by governing the field intensity of such motors.

Figure 1:
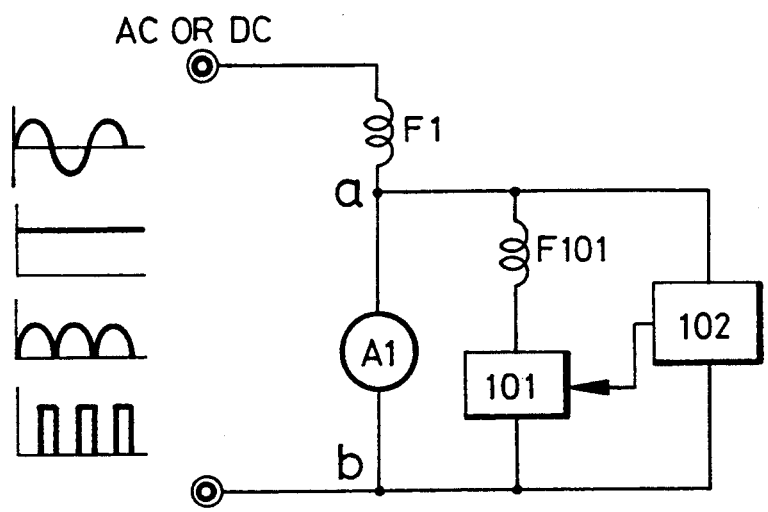
FIG. 1 is a block diagram of a governor circuit for universal series (or compound) motors according to one embodiment of the present invention which employs an auxiliary field winding F101.

FIG. 1 is a block diagram configuration of the governor circuit according to one embodiment of the present invention. The governor circuit is shown to be incorporated in a conventional series motor, wherein a field winding F1 and an armature A1 are connected in series. The governor circuit includes and auxiliary field winding F101 in series with a current shunting element 101, both connected in parallel across the armature A1 of the series motor. The current shunting element 101 may be any voltage-triggered switch device capable of selectively gating current through to the auxiliary field winding F101.

In addition, a voltage detector element 102 is connected in parallel with the armature A1 across the auxiliary field winding F101 and current shunting element 101. The voltage detector 102 simply detects when the armature A1 voltage exceeds a predetermined threshold, an this may be done by conventional voltage division. When the armature A1 voltage exceeds the threshold level, voltage detector 102 triggers the current shunting element 101 to shunt current through the auxiliary field winding F101 and around the armature A1.

The above-described embodiment of the governor circuit may be powered by AC, in which case the current shunting element 101 is preferably a conventional AC switching device such as a triac or, alternatively, a full bridge rectifier in conjunction with a uni-directional switching device such as a silicon controlled rectifier or power transistor. It should be noted that "triac" is considered to be a common term of art and is intended to designate the equivalent of parallely-connected silicon controlled rectifiers which serve as a gated AC control switch. Voltage detector 102 is preferably a conventional voltage-divider network which may include a bridge-type rectifier. Alternatively, the governor circuit may be powered by pulsed-DC, in which case the current shunting element 101 may be a conventional uni-directional switching device such as a thyristor or power transistor. The governor circuit may also be DC powered, in which case the current shunting element 101 is preferably a power transistor.

In operation, the above-described governor circuit provides a top-speed limiting function. As a substantially no-load condition is encountered by the motor, the speed will accelerate and the voltage appearing across the armature A1 will increase accordingly. Voltage detector 102 will detect the predetermined armature A1 threshold voltage level and will thereupon trigger the current shunting circuit 101. Current shunting circuit 101 will conduct, thereby shunting current through the auxiliary field winding F101. This shunting action clamps the armature A1 voltage to the preset threshold voltage level and limits the speed of the motor in accordance with the threshold level.

The speed governor function is very useful in light-load/high-speed conditions, when the speed of the motor can reach harmfully high levels.

As will be described, the voltage detector circuit 102 may be made adjustable in order that the threshold voltage level may be varied. This way, the top speed limit of the motor can be varied as well.

Figure 2:
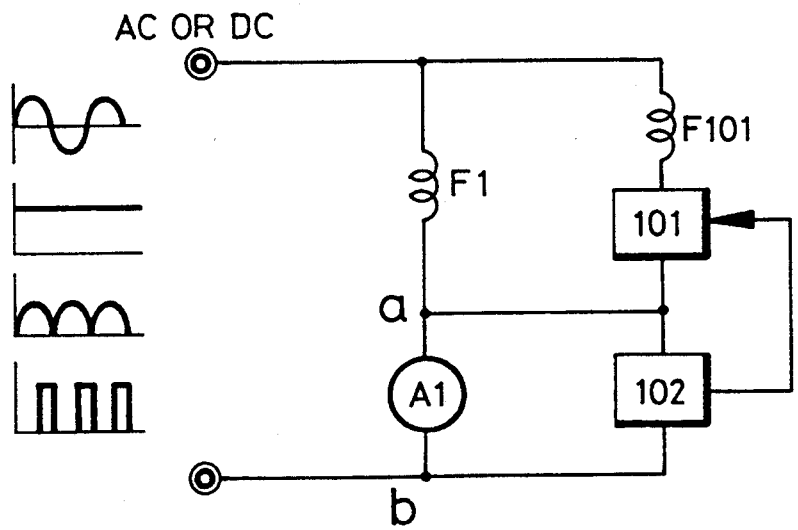
FIG. 2 is a block diagram of a governor circuit according to a second embodiment of the present invention.

FIG. 2 is a block diagram of an alternative embodiment of the governor circuit according to the present invention. In this configuration, a series-connected current shunting element 101 and auxiliary field winding F101 are placed in parallel with the main field winding F1. A voltage detector 102 is connected in parallel with the armature A1 in order to detect the armature voltage. The voltage detecting and current shunting functions are essentially the same as described in FIG. 1, however, when the voltage detecting circuit 102 triggers the current shunting circuit 101 to conduct, current is shunted through the auxiliary field winding F101 around the main field winding F1. This shunting action clamps the main field winding F1 voltage to the preset threshold voltage level and limits the speed of the motor in accordance with the threshold level.

Figure 3:
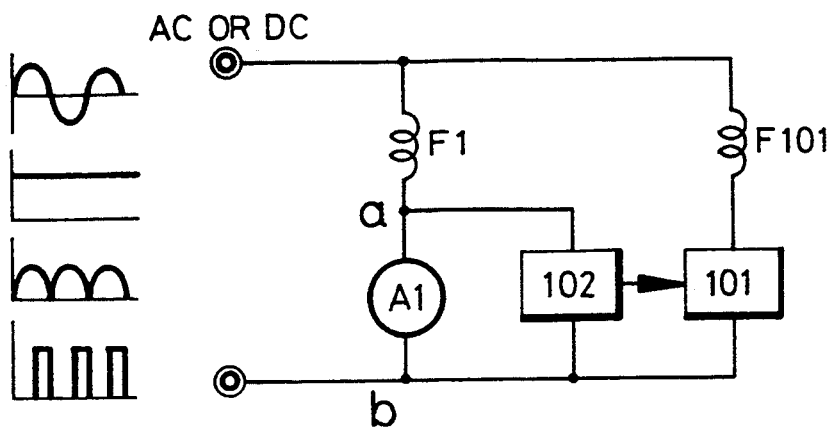
FIG. 3 is a block diagram of a governor circuit according to a third embodiment of the present invention.

FIG. 3 is a block diagram of a third embodiment of the governor circuit in accordance with the present invention. In this configuration, the series-connected current shunting element 101 and auxiliary field winding F101 are connected in parallel with the series combination of the main field winding F1 and the armature A1. The voltage detector 102 is connected in parallel with the armature A1. The voltage detecting and current shunting functions are essentially the same as described in regard to FIG. 1, however, when the voltage detecting circuit 102 triggers the current shunting circuit 101 to conduct, current is shunted through the auxiliary field winding F101 around both the main field winding F1 and armature A1. This shunting action clamps the combined voltage across both the main field winding F1 and armature A1 to the preset threshold voltage level and limits the speed of the motor in accordance with the threshold level.

Figure 4:
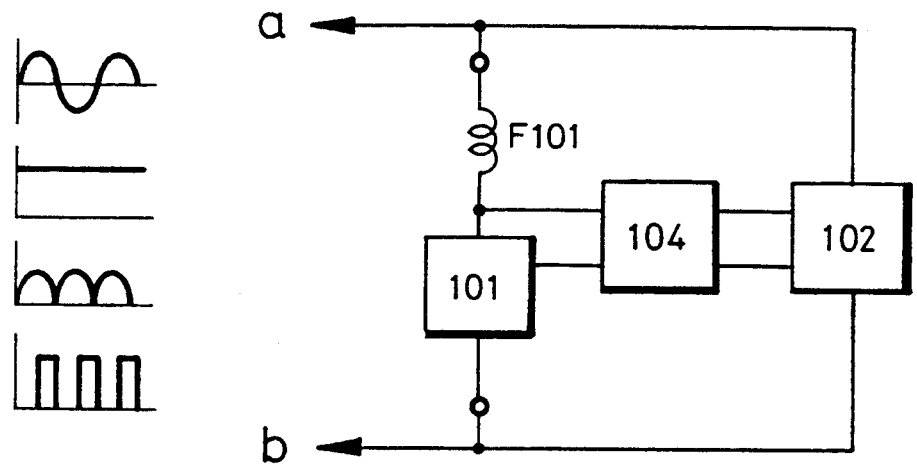
FIG. 4 is a block diagram of the governor circuit of the present invention and, additionally, a separator type shunting coupling interface 104 according to a fourth embodiment of the present invention.

FIG. 4 is a block diagram of the governor circuit according to the present invention further including a conventional isolator-type coupling interface 104 which is interconnected between the voltage detector 102 and the current shunting element 101.

The coupling interface 104 may take the form of a photoelectric or optical-isolator type coupler or a solenoid coupler. This coupler may be employed in any of the three governor circuit embodiments described in FIGS. 1–3.

FIGS. 5–11 depict detailed schematics of several possible embodiments of the governor circuit which are designed to accommodate AC, DC, or pulsed-DC power supply types.

Figure 5:
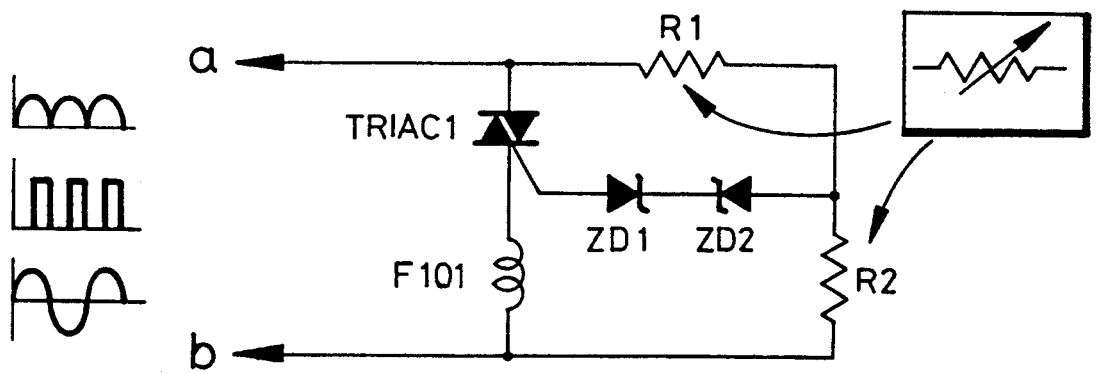
FIG. 5 is a detailed schematic of the governor circuit of FIG. 1 in which current shunt element 101 further comprises a triac TRIAC1 and voltage detector circuit 102 further comprises a series resistor pair, R1 and R2.

FIG. 5 illustrates a governor circuit employing a triac TRIAC1 as the current shunt element 101, TRIAC1 being connected in series with the auxiliary field winding F101, and a series resistor-divider pair, R1 and R2, as the voltage detecting element 102, resistors R1 and R2 being connected in parallel with TRIAC1 and auxiliary winding F101. In addition, two bi-polar zener diodes ZD1 and ZD2 are connected in series to couple the gate of TRIAC1 with the voltage divided level established between resistors R1 and R2. This governor circuit may be used in conjunction with AC or pulsed-DC power supply types. Resistor R1 of the voltage detector 102 may be a variable resistor or a stepwise adjustable resistor to allow adjustment of the threshold voltage level and resulting top speed of the motor.

Figure 6:
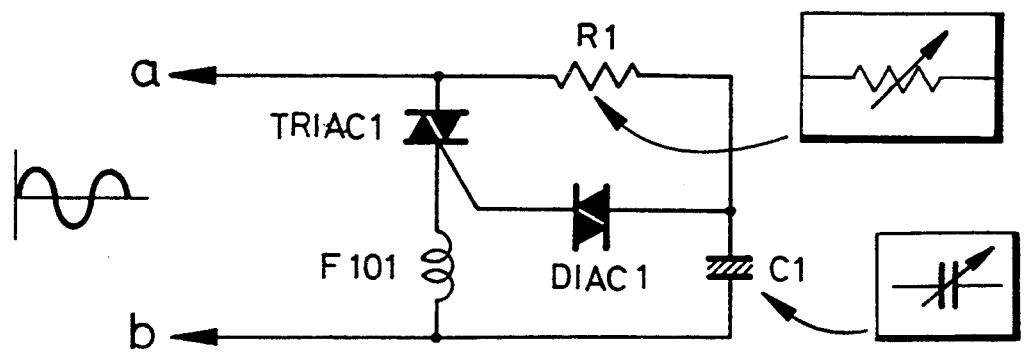
FIG. 6 is a detailed schematic of the governor circuit as in FIG. 5 in which a capacitor C1 is substituted for resistor R2 in order to smooth out the divided voltage reference level relative to an AC source. In addition, the zener diodes ZD1 and ZD2 of FIG. 5 are replaced by a diac DIAC1.

FIG. 6 is another embodiment of the governor circuit in which the Zener diodes ZD1, ZD2 of FIG. 5 are replaced by an AC diode DIAC1. It should be noted that "diac" is considered to be a common term of art and is intended to designate the equivalent of an AC diode, which essentially serves the same purpose as two bi-polar diodes. In addition, resistor R2 is replaced by a capacitor C1 to form an R-C voltage divider which serves as voltage detector 102. This circuit may be used in conjunction with AC power supply types. Again, resistor R1 of the voltage detector may be replaced by a variable or stepwise resistor and, similarly, capacitor C1 may be replaced by a variable or stepwise capacitor to allow modification of the threshold voltage level and top speed of the motor.

Figure 7:
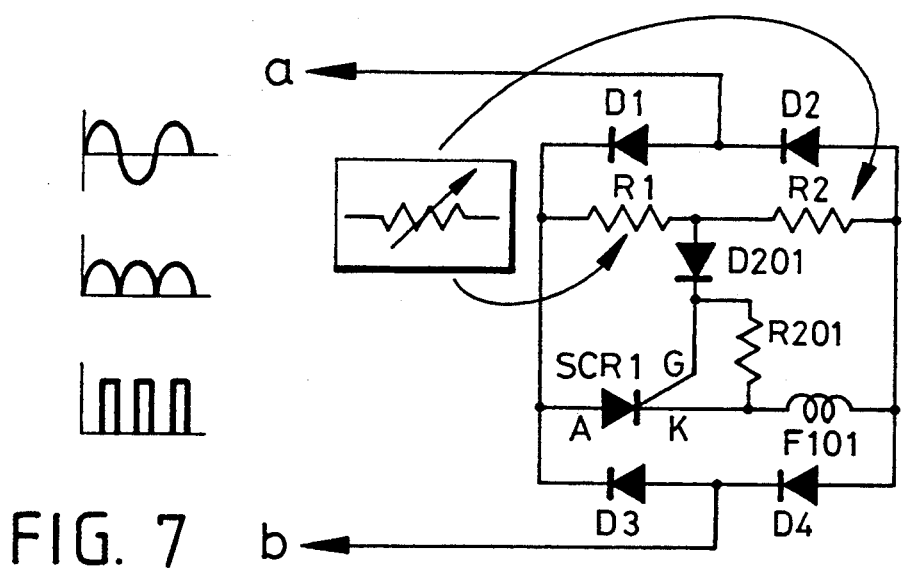
FIG. 7 is a detailed schematic of another variation of the governor circuit of FIG. 1 employing a bridge-type rectifier D1–D4 and silicon controlled rectifier SCR1 as the shunt element 101 and a series resistor pair, R1 and R2, as the voltage detector element 102.

FIG. 7 is another embodiment of the governor circuit which employs a full bridge-type rectifier including diodes D1-D4. In addition, a silicon controlled rectifier SCR1 is coupled in series with the auxiliary field winding F101 across the diode bridge to form the current shunt element 101, and a series resistor pair R1 and R2 are coupled across the diode bridge to form the detector element 102. The anode A of SCR1 is connected to the positive end of the diode bridge rectifier circuit, while cathode K of SCR1 is connected to the negative end of the diode bridge rectifier circuit. The voltage divided level between resistors R1 and R2 is connected to the gate G of SCR1 through a protective diode D201, and a protective shunt resistor R201 may be connected across gate (G) and cathode (K) of the SCR1. Rectifier D1-D4 allows uni-directional current flow when coupled to an AC source, and this facilitates the use of the uni-directional switch SCR1. Protective diode D201 prevents the backflow of AC current to the series resistors R1 and R2. This governor circuit may be used with AC or pulsed-DC power supply types. Once again, resistor R1 may be a variable or stepwise resistor to allow modification of the threshold voltage level and the top speed limit of the motor.

Figure 8:
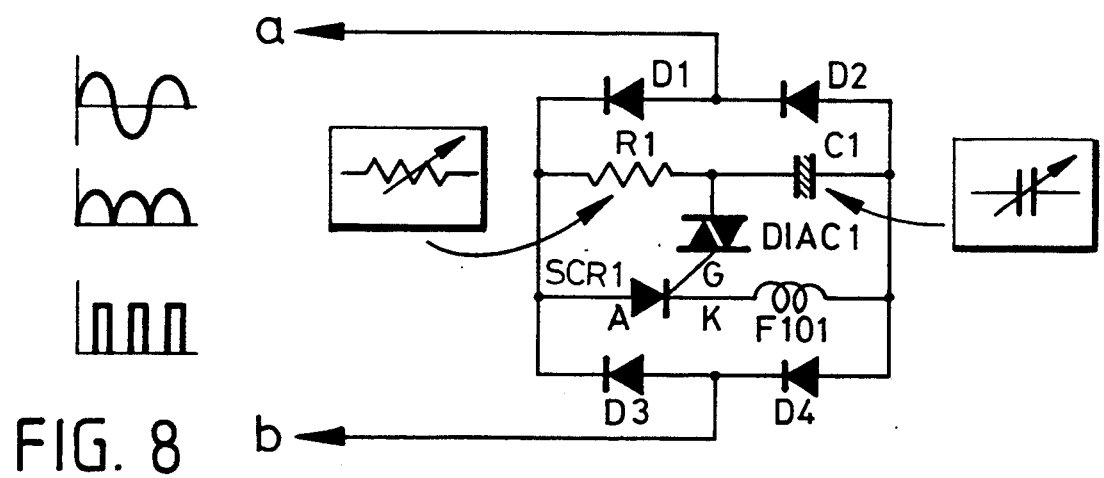
FIG. 8 is a detailed schematic of another variation of the governor circuit of FIG. 1 employing a bridge type rectifier D1–D4 and an AC diode DIAC1 as the shunt element 101 and a series resistor/capacitor pair, R1 and C1, as the voltage detector element 102.

FIG. 8 is a variation of the embodiment in FIG. 7 which is suited for use with AC and pulsed-DC power supply types. In this configuration, resistor R2 of the FIG. 7 is replaced by capacitor C1, and protective diode D201 and protective resistor R201 of FIG. 7 are replaced by a trigger diode DIAC1. The operation of the governor circuit of FIG. 8 is essentially as described in regard to FIG. 6, however, no rectification is provided.

Figure 9:
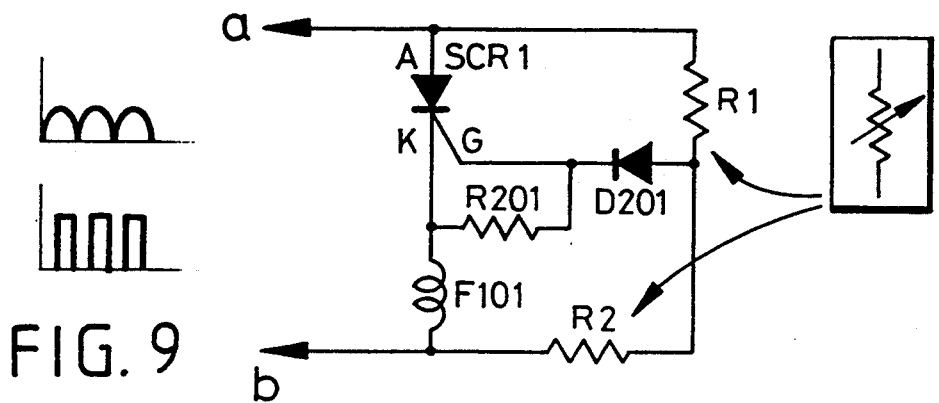
FIG. 9 is a detailed schematic of still another variation of the governor circuit of FIG. 1 employing a silicon controlled rectifier SCR1 as the shunt element 101 and a series resistor pair R1 and R2 as the voltage detector element 102.

FIG. 9 is a schematic of another embodiment of the governor circuit which employs a silicon controlled rectifier SCR1 as the shunt element 101 and a series resistor pair R1 and R2 as the detector element 102. In this configuration, the anode A of SCR1 is connected in series to the auxiliary field winding F101, and series-connected SCR1 and F101 are connected in parallel across the series resistors R1 and R2. The gate G of SCR1 is coupled to the divided voltage between resistors R1 and R2 via protective diode D201. A resistor R201 is connected between the auxiliary field winding F101 and the gate G of SCR1. The operation of the governor circuit of FIG. 9 is essentially as described in regard to FIG. 7, however, no rectification is provided. This governor circuit is suitable for use with a pulsed-DC power supply. Resistor R1 may be replaced by a variable or stepwise resistor to allow modification of the threshold voltage level and top speed of the motor.

Figure 10:
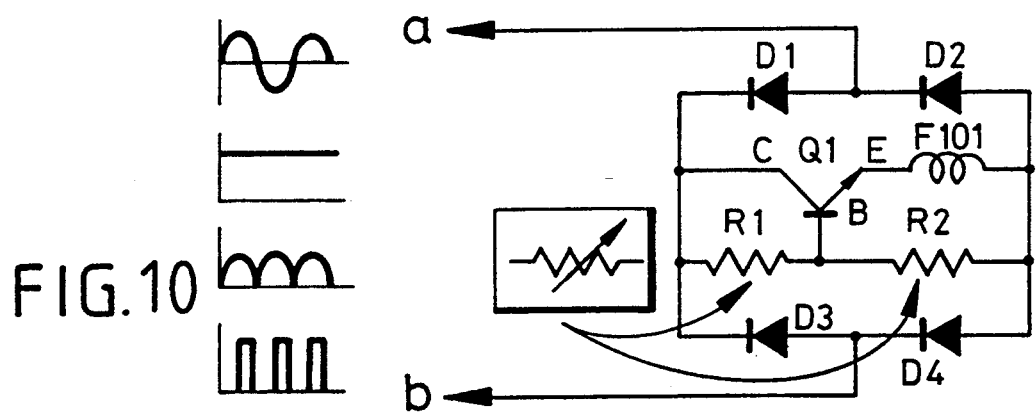
FIG. 10 is a detailed schematic of yet another variation of the governor circuit of FIG. 1 employing a employing a power transistor Q1 and a bridge-type rectifier D1–D4 as the shunt element 101, and a series resistor pair R1 and R2 as the voltage detector element 102.

FIG. 10 is a schematic diagram of another alternative embodiment of the governor circuit which employs a full bridge-type rectifier including diodes D1-D4, and a power transistor Q1 connected in series with auxiliary winding F101 to form the shunt element 101, the collector C of transistor Q1 being coupled to the positive end of the diode bridge, and the emitter E being coupled to the negative end. A series-resistor pair R1 and R2 is also coupled across the diode bridge to form the voltage detector 102. The base B of power transistor Q1 is directly coupled to the divided voltage level between resistors R1 and R2 of the voltage detector 102. The operation of the governor circuit of FIG. 10 is essentially as described in regard to FIG. 7. This governor circuit is suited for use with an AC, DC, or pulsed-DC power supply types. Resistor R1 may be a variable or stepwise adjustable resistor to allow modification of the threshold voltage level and top speed of the motor.

Figure 11:
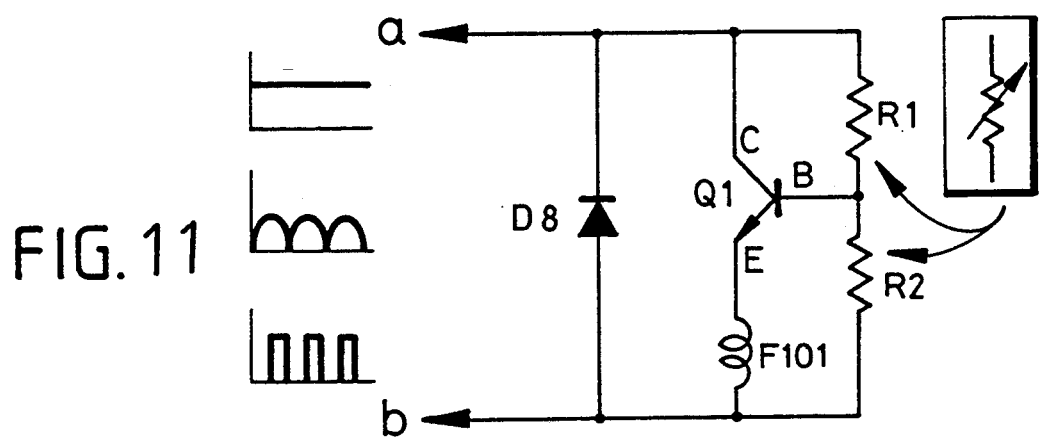
FIG. 11 is a detailed schematic of yet another variation of the governor circuit of FIG. 1 employing a power transistor Q1 and a bridge-type rectifier D1–D4 as the shunt element 101, and a series resistor pair R1 and R2 as the voltage detector element 102.

FIG. 11 is a schematic of another embodiment of the governor circuit which employs a power transistor Q1 as the current shunt element 101 connected in series with the auxiliary winding F101, and a series resistor pair R1 and R2 as the detector element 102. In this configuration, the shunt element Q1 and the auxiliary field winding F101 are connected in parallel with the series resistors R1 and R2, which are in turn connected in parallel with a flywheel diode D8. For an NPN power transistor Q1, the collector C is connected to terminal a for connection to the positive end of the armature, and the emitter E is connected to terminal b for connection to the negative end of the armature. Conversely, for a PNP transistor Q1, the collector C should be connected to the negative end of the armature while the emitter E should be connected to the positive end of the armature. The base B of power transistor Q1 is directly coupled with the divided voltage level at the series connection between resistors R1 and R2 of the detector element 102. The operation of the governor circuit of FIG. 11 is essentially as described in regard to FIG. 10, however, no rectification is provided. This governor circuit may be used with DC or pulsed-DC power supply types. Resistor R1 may be a variable or stepwise adjustable resistor to allow modification of the threshold voltage level and top speed of the motor.

In all of the above-described FIGS. 5-11, a conventional isolator-type coupling interface 104 as shown in FIG. 4 may be interconnected between the voltage detector 102 and the current shunting element 101 to isolate the two. The coupling interface 104 may be a photoelectric or optical-isolator type coupler or a solenoid coupler.

In addition, the reaction time between voltage threshold level detection at voltage detector 102 and clamping of motor speed by current shunt element 101 can be reduced in all of the above-described embodiments of FIGS. 5–11 simply by connecting a conventional amplifier circuit between the detector and shunt elements. Such an amplifier circuit may take the form of a Darlington power transistor or a thyristor.

Furthermore, any of the passive components such as resistors R1 and R2, capacitor C1, etc., may be a variable or stepwise adjustable component to allow modification of the threshold voltage level and top speed of the motor.

FIG. 12 is a graph of the RPM (speed) v. TORQUE (load) characteristics of a conventional series motor under normal operating conditions. Note that with decreasing load the motor speed increases rapidly. This may have harmful consequences under light-load conditions.

FIG. 13 is a RPM (speed) v. TORQUE (load) graph of the RPM (speed) v. TORQUE (load) characteristics of a conventional series motor employing a governor circuit in accordance with the present invention. Note that the top speed of the motor is clamped at a preset limit by the governor. This top speed limit is directly related to the threshold voltage level as determined by the voltage detector 102. Once the threshold voltage level is detected at voltage detector 102, the current shunting element 101 is triggered, and this diverts current from the armature A1, thereby clamping the armature A1 voltage at the threshold level and limiting the top speed of the motor.

Having now fully set forth a detailed example and certain modifications incorporating the concept underlying the present invention, various other modifications will obviously occur to those skilled in the art upon becoming familiar with said underlying concept. It is to be understood, therefore, that within the scope of the appended claims, the invention may be practiced otherwise than as specifically set forth herein.

I claim:

1. A governor circuit for limiting the top speed of a universal series motor of the type having a series-connected main field winding and armature winding, said governor circuit comprising:
    a voltage detector circuit coupled to the armature of said motor for detecting a threshold voltage across said armature;
    an auxiliary field winding; and
    a current shunting circuit connected in series with said auxiliary field winding, said series connected auxiliary field winding and shunting circuit being coupled across said armature for providing a current shunt path around said armature, said current shunting circuit also being connected to said voltage detector circuit and triggered thereby upon detection of said threshold voltage to shunt current through said auxiliary field winding;
    whereby said armature voltage is clamped at a constant level and the motor is limited to a maximum speed in accordance therewith.

2. The governor circuit according to claim 1, wherein said voltage detecting circuit is connected in parallel with said series-connected auxiliary field winding and current shunting circuit, and is also connected in parallel with said armature of said motor.

3. The governor circuit according to claim 2, wherein said voltage detecting circuit further comprises:
    a voltage divider including a series-connected first resistor and second resistor for providing a reference voltage at the junction of said first and second resistors, and a bi-polar pair of zener diodes; and
    said current shunting circuit further comprises a triac, said triac having a gate electrode connected to the junction of said first and second resistor through said bi-polar pair of zener diodes for gating in accordance with said reference voltage.

4. The governor circuit according to claim 3, wherein said first resistor is a variable resistor for allowing adjustment of said voltage reference.

5. The governor circuit according to claim 3, wherein said second resistor is a variable resistor for allowing adjustment of said voltage reference.

6. The governor circuit according to claim 2, wherein said voltage detecting circuit further comprises a voltage divider including a series-connected resistor and capacitor for providing a reference voltage at the junction of said resistor and capacitor, and said current shunting circuit further comprises a triac and a diac, said triac having a gate electrode connected to the junction of said resistor and capacitor through said diac for gating in accordance with said reference voltage.

7. The governor circuit according to claim 6, wherein said resistor is a variable resistor for allowing adjustment of said voltage reference.

8. The governor circuit according to claim 6, wherein said capacitor is a variable capacitor for allowing adjustment of said voltage reference.

9. The governor circuit according to claim 2, wherein said voltage detecting circuit further comprises a voltage divider including a series-connected first resistor and second resistor for providing a reference voltage at the junction of said first resistor and second resistor, and said current shunting circuit further comprises a silicon controlled rectifier and a diode, said silicon controlled rectifier having a gate electrode connected to the junction of said first and second resistor through said diode for gating in accordance with said reference voltage.

10. The governor circuit according to claim 9, wherein said first resistor is a variable resistor for allowing adjustment of said voltage reference.

11. The governor circuit according to claim 9, wherein said second resistor is a variable resistor for allowing adjustment of said voltage reference.

12. The governor circuit according to claim 9, wherein said current shunting circuit further comprises a protective resistor connected between said gate of said silicon controlled rectifier and said auxiliary field winding.

13. The governor circuit of claim 2, wherein said voltage detecting circuit further comprises a voltage divider including a series-connected first resistor and second resistor for providing a reference voltage at the junction therebetween, and said current shunting circuit further comprises a transistor having a collector and emitter connected in series with said auxiliary field winding, said transistor further having a base connected to said junction between said first and second resistor for gating in accordance with said reference voltage.

14. The governor circuit according to claim 13, further comprising a diode connected in parallel across said series-connected transistor and auxiliary field winding.

15. The governor circuit according to claim 13, wherein said first resistor is a variable resistor for allowing adjustment of said voltage reference.

16. The governor circuit according to claim 13, wherein said second resistor is a variable resistor for allowing adjustment of said voltage reference.

17. The governor circuit according to claim 1, wherein said series-connected auxiliary field winding and current shunting circuit are connected in parallel to the main field winding of said motor, said voltage detecting circuit is connected in parallel to said armature of said motor, and said voltage detecting circuit is connected in series with said series-connected auxiliary field winding and current shunting circuit.

18. The governor circuit according to claim 1, wherein said voltage detecting circuit is connected in parallel with said armature of said motor, and said series-connected auxiliary field winding and current shunting circuit are connected in parallel with the series-connected armature and main field winding of said motor.

19. A governor circuit for limiting the top speed of a universal series motor of the type having a series-connected main field winding and an armature winding, said governor circuit comprising:
- a voltage detector circuit coupled to the armature of said motor for detecting a reference voltage across said armature, said voltage detector circuit further comprising,
- four diodes including a first diode through a fourth diode connected in a full bridge configuration, and
- a series connected first resistor and second resistor coupled across said diode bridge for providing a reference voltage at the junction between said first resistor and second resistor;
- a current shunting circuit connected across said diode bridge for selectively shunting current therethrough and around said armature, said current shunting circuit further comprising,
- a silicon controlled rectifier having anode, cathode and gate electrodes;
- an auxiliary field winding;
- said silicon controlled rectifier anode and cathode being connected in series with said auxiliary field winding across said diode bridge, and
- a diode connecting said gate of said silicon controlled rectifier to the junction between said first resistor and second resistor, said silicon controlled rectifier being triggered by said reference voltage to shunt current through said auxiliary field winding;
- whereby the voltage across said armature is clamped at a constant level and the motor is limited to a maximum speed in accordance therewith.

20. The governor circuit according to claim 19, wherein said current shunting circuit further comprises a protective resistor connected between said gate of said silicon controlled rectifier and said auxiliary field winding.

21. A governor circuit for limiting the top speed of a universal series motor of the type having a series-connected main field winding and an armature winding, said governor circuit comprising:
- a voltage detector circuit coupled to the armature of said motor for detecting a reference voltage across said armature, said voltage detector circuit further comprising,
- four diodes including a first diode through a fourth diode connected in a full bridge configuration, and
- a series connected resistor and capacitor coupled across said diode bridge for providing a reference voltage at the junction between said resistor and capacitor;
- a current shunting circuit connected across said diode bridge for selectively shunting current therethrough and around said armature, said current shunting circuit further comprising,
- a silicon controlled rectifier having anode, cathode and gate electrodes;
- an auxiliary field winding;
- said silicon controlled rectifier anode and cathode being connected in series with said auxiliary field winding across said diode bridge, and
- a diac connecting said gate of said silicon controlled rectifier to the junction between said resistor and capacitor, said silicon controlled rectifier being triggered by said reference voltage to shunt current through said auxiliary field winding;
- whereby the voltage across said armature is clamped at a constant level and the motor is limited to a maximum speed in accordance therewith.

22. The governor circuit according to claim 21, wherein said resistor is a variable resistor for allowing adjustment of said voltage reference.

23. The governor circuit according to claim 21, wherein said capacitor is a variable capacitor for allowing adjustment of said voltage reference.

24. A governor circuit for limiting the top speed of a universal series motor of the type having a series-connected main field winding and an armature winding, said governor circuit comprising:
- a voltage detector circuit coupled to the armature of said motor for detecting a reference voltage across said armature, said voltage detector circuit further comprising,
- four diodes including a first diode through a fourth diode connected in a full bridge configuration, and
- a series connected first resistor and second resistor coupled across said diode bridge for providing a reference voltage at the junction between said first resistor and second resistor;
- a current shunting circuit connected across said diode bridge for selectively shunting current therethrough and around said armature, said current shunting circuit further comprising,
- an auxiliary field winding;
- a transistor having a collector and emitter connected in series with said auxiliary field winding said series-connected transistor and auxiliary field winding being connected across said diode bridge, said transistor additionally having a base connected to the junction between said first resistor and second resistor, said transistor being triggered by said reference voltage to shunt current through said auxiliary field winding;
- whereby the voltage across said armature is clamped at a constant level and the motor is limited to a maximum speed in accordance therewith.

25. The governor circuit according to claim 24, wherein said first resistor is a variable resistor for allowing adjustment of said voltage reference.

26. The governor circuit according to claim 25, wherein said second resistor is a variable resistor for allowing adjustment of said voltage reference.

27. A governor circuit for limiting the top speed of a universal series motor of the type having a series-connected main field winding and armature winding, said governor circuit comprising:
- a voltage detector circuit coupled to the armature of said motor for detecting a threshold voltage across said armature;

an auxiliary field winding; and a current shunting circuit connected in series with said auxiliary field winding, said series connected auxiliary field winding and shunting circuit being coupled across said armature for providing a current shunt path around said armature;

an isolator circuit connected between said current shunting circuit and said voltage detector for providing an electrically isolated coupling therebetween, said current shunting circuit being triggered by said voltage detector via said isolator circuit upon detection of said threshold voltage to shunt current through said auxiliary field winding;

whereby said armature voltage is clamped at a constant level and the motor is limited to a maximum speed in accordance therewith.

28. The governor circuit according to claim 27, wherein said voltage detecting circuit is connected in parallel with said series-connected auxiliary field winding and current shunting circuit, and is further connected in parallel with said armature of said motor.

* * * * *